(12) United States Patent
Thomson

(10) Patent No.: US 7,493,918 B2
(45) Date of Patent: Feb. 24, 2009

(54) FLUID CONDUIT

(75) Inventor: Fraser Hynd Thomson, Tayside (GB)

(73) Assignee: Oceaneering International Services Ltd., London (GB)

( * ) Notice: Subject to any disclaimer, the term of this patent is extended or adjusted under 35 U.S.C. 154(b) by 64 days.

(21) Appl. No.: 10/950,272

(22) Filed: Sep. 24, 2004

(65) Prior Publication Data
US 2005/0067034 A1    Mar. 31, 2005

(30) Foreign Application Priority Data
Sep. 26, 2003    (GB)    ................... 0322529.9

(51) Int. Cl.
F16L 11/00    (2006.01)

(52) U.S. Cl. .................. 138/130; 138/121; 138/131; 138/139

(58) Field of Classification Search ............. 138/121, 138/131, 139, 130
See application file for complete search history.

(56) References Cited

U.S. PATENT DOCUMENTS

| | | | | |
|---|---|---|---|---|
| 3,506,040 A | * | 4/1970 | Everling et al. ........... | 138/130 |
| 3,580,289 A | * | 5/1971 | James et al. ............... | 138/121 |
| 4,423,283 A | * | 12/1983 | Weismann ................. | 174/47 |
| 4,570,680 A | | 2/1986 | Ratti | |
| 4,727,909 A | * | 3/1988 | Griffiths .................... | 138/127 |
| 5,271,977 A | | 12/1993 | Yoshikawa | |
| 5,307,842 A | * | 5/1994 | Lequeux .................... | 138/149 |
| 5,406,984 A | * | 4/1995 | Sugier et al. ............... | 138/135 |
| 5,934,335 A | * | 8/1999 | Hardy ........................ | 138/131 |
| 6,012,495 A | * | 1/2000 | Antonsen ................... | 138/131 |
| 6,016,847 A | * | 1/2000 | Jung et al. .................. | 138/131 |
| 6,110,550 A | * | 8/2000 | Jarrin et al. ............. | 428/36.91 |
| 6,516,833 B1 | | 2/2003 | Witz | |
| 6,843,278 B2 | * | 1/2005 | Espinasse ................... | 138/134 |
| 6,883,551 B2 | * | 4/2005 | Bourgois et al. ........... | 138/127 |
| 6,889,718 B2 | | 5/2005 | Glejbol | |
| 6,901,968 B2 | | 6/2005 | Thomson | |
| 7,086,419 B2 | * | 8/2006 | Takagi et al. ............... | 138/121 |
| 2001/0021426 A1 | | 9/2001 | Procida | |
| 2002/0056481 A1 | | 5/2002 | Nakakita | |
| 2002/0100516 A1 | * | 8/2002 | Powell et al. ............... | 138/125 |

FOREIGN PATENT DOCUMENTS

| | | |
|---|---|---|
| GB | 2014689 A | 2/1979 |
| GB | 2114257 A | 1/1983 |
| GB | 2245678 A | 1/1992 |
| JP | 100019170 A | 1/1998 |
| JP | 2000-002375 | 7/2000 |

\* cited by examiner

*Primary Examiner*—James F Hook
(74) *Attorney, Agent, or Firm*—Young Basile

(57) ABSTRACT

The present invention relates to fluid conduit (1) suitable for use in the transportation of working fluids to a wellhead or the like from a topside location or the like. The fluid conduit (1) is suitable for use in a multi-conduit umbilical. The conduit comprises an inner flexible collapse resistant hose (2) surrounded by a hose liner (4), and at least one pair of helically contra-wound high tensile wires (6a, 6b). Each turn of each wire (6a, 6b) is in substantially close contact with adjacent turns thereof. A multi-conduit umbilical comprising a plurality of the fluid conduits bundled together and provided with an outer sheath is also described.

17 Claims, 1 Drawing Sheet

FLUID CONDUIT

RELATED APPLICATIONS

The present application claims priority from British Application No. GB0322529.9 filed on Sep. 26, 2003.

FIELD OF THE INVENTION

The present invention relates to a conduit suitable for use in transporting fluids, particularly well control fluids and hydraulic fluids, and particularly to a fluid conduit or hose, sometimes referred to as an umbilical or a work over umbilical, for use in, for example offshore drilling environments including oil/gas exploration and production.

BACKGROUND OF THE INVENTION

In offshore drilling environments it is necessary to supply hydraulic fluids to the wellhead and the standard practice up until relatively recently has been to use a standard thermoplastic hydraulic sub-sea control umbilical hose for the purpose of work over control where work over operations are performed on a sub-sea wellhead using a work over riser. These standard hydraulic sub-sea control umbilical hoses are placed outside the riser from the topside down to the wellhead.

Recent deepwater sub-sea exploration has created the demand and need to place the work over umbilical within the riser annulus of the drill string and conventional thermoplastic hoses have proved to be unsuitable for a number of reasons as follows:—

Temperature—Where a work over umbilical is inserted into the riser annulus the umbilical may be subjected to temperatures of up to 130° C. from the wellstream flowing through the riser core. High temperatures significantly reduce the mechanical properties of the polymers used in standard sub-sea control hoses causing end fittings to creep and fail. Additionally high temperatures affect the collapse resistance of the hose due to the reduction in the modulus of elasticity for the polymers used. Furthermore, at elevated temperatures polymers have a reduced resistance to chemical attack and for the rate of chemical attack to increase. Additionally at elevated temperatures the tensile strength of the pressure containment layer of a conventional braided hoses, typically an aramid fibre braided pressure containment layer, reduces and thus the burst pressure of the hose is reduced.

High external pressures—Deepwater sub-sea exploration now takes place in water depths of up to three thousand metres (3000 m) where differential pressures, that is the difference in pressure between the fluid in an umbilical and the surrounding riser annulus liquid (typically a mud having a specific gravity of 2 or more) can be up to 300 bar (30 MN/m$^2$). High external pressures significantly reduce the tensile strength and fatigue resistance of the pressure containment layer, typically an aramid fibre braided pressure containment layer, as the material is sandwiched between a core tube and an outer jacket and is subjected to significant and damaging crush loads found at the wellhead in such deep water installations.

High working pressures—In order to operate the hydraulic control and chemical injection hoses at depths of up to 3000 m, where differential pressures are up to 300 bar (30 MN/m$^2$), very high topside or ambient pressures are required, typically 1200 bar is required. Conventional standard thermoplastic hoses using aramid fibre braided layer technology to contain the working fluid at these elevated working pressures are unsuitable due to the limitations in material technology which give rise to reductions in the operational reliability of such hoses.

Furthermore the muds used within the riser annulus create a highly corrosive, abrasive and volatile environment where conventional hose structures/hose materials are unsuitable.

It is an object of the present invention to avoid or minimise one or more of the foregoing disadvantages.

SUMMARY OF THE INVENTION

The present invention relates to a fluid conduit for use in the transportation of working fluids to a wellhead or the like from a topside location or the like, and which is suitable for use in a multi-conduit umbilical, which conduit comprises an inner flexible collapse resistant hose, said collapse resistant hose being surrounded by a hose liner, and at least one pair of helically contra-wound high tensile strand material, with each turn of said strand material being in substantially close contact with adjacent turns thereof.

In another respect the present invention relates to a multi-conduit umbilical comprising a plurality of the aforesaid fluid conduits according to the first aspect of the invention, bundled together and provided with an outer sheath.

Thus, with a fluid conduit and/or a multi-conduit umbilical, according to either aspect of the present invention, the problems of supplying working fluids such as highly pressurised hydraulic fluids through a conduit/umbilical within the riser annulus of a drill string can be achieved and realised for the first time, in an economical and reliable manner.

Any suitable form of collapse resistant hose may be used though preferably it is selected from the group including a metallic interlock wound carcass, a thin wall metal tube, a helically closed coil spring, or a thin wall corrugated metal tube. Given the very high pressures experienced at depths of up to 3000 m and the aforementioned differential pressures said collapse resistant hose has to have the capacity to avoid collapsing at up to pressures of 600 bar so as to provide for adequate factors of safety/reliability. Any suitable size of collapse resistant hose may be used but preferably they are selected from the group including ¼ in (6.35 mm); 3/16 in (4.76 mm) up to ¾ in (19.05 mm) internal diameter. A suitable form of collapse resistant hose is available from the applicant, Oceaneering International Services Limited.

Preferably said hose liner is extruded over said collapse resistant hose so as to provide a protective layer to the generally metallic collapse resistant hose material. Preferably there is used a polymer material, preferably a fluoro-polymer, for example PVDF, E-CTFE, PFA or MFA which have the desired mechanical and chemical resistance properties required to operate at the elevated temperatures found within the riser annulus, typically up to and in excess of 130° C. Typically said hose liner layer has a thickness in the range of from 0.5 mm to 2.5 mm, desirably 1 to 1.5 mm. Said hose liner can be made of a multi-layer construction—for example two or three layers—the innermost layer being of a temperature resistant fluoropolymer and the outermost layer a conventional Nylon 11 or XLPE or PE sandwiched together with a thin polymeric chemical bond tie layer.

Preferably the high tensile strand material used in said at least one pair thereof is a high tensile steel wire having a diameter of from 0.25 mm to 1 mm, desirably 0.5 mm to 0.6 mm. Preferably said high tensile steel wire is a high tensile high carbon steel wire, cold drawn, annealed, heat treated to produce ultimate tensile strengths range between 1200 to 2100 mPa with or without a hot dipped or electroplated galvanic/corrosion protective thin layer. There may be used additional layers comprising further pairs of said helically contra-wound high tensile strand material but it is a requirement of the present invention that each pair are helically contra-wound with respect to each other so as to hold each paired layer in place and to withstand the high pressures. It is a essential requirement of the invention that each turn of the high tensile strand material is in substantially close contact with adjacent turns thereof so as to substantially encase the hose liner and the collapse resistant hose therein and to provide close to 100% nominal coverage thereof.

Preferably the high tensile strand or wire material is wound around the hose liner at an angle of from 45° to 70°, desirably 50° to 60°, advantageously 54.4° relative to the longitudinal axis of the conduit.

Preferably there is used an adhesive or bonding means to bond said adjacent turns of the strand material to each other and to bond each layer of said pair of helically contra-wound high tensile strand material to each other. Desirably where there is used a plurality of pairs of said strand material, each one of said plurality is bonded to the next. Said adhesive or bonding means serves also to fix the first layer of strand material to the hose liner layer.

Alternatively or additionally there is advantageously provided a filler material between adjacent turns and/or layers of said strand material so as to substantially eliminate any voids between adjacent strands of material. It is to be appreciated that the inclusion of voids within such a conduit structure can give rise to pressure balancing within a conduit structure which could cause failure in such a highly pressurised working environment.

Conveniently said adhesive or bonding means constitutes said filler material or filling medium wherein said filling medium is provided around said strand material and between each layer of said strand material. There are three approaches depending on operational requirements as follows:
a) No filling medium—used in lower working pressures (10 kpsi (690 bar) or less) and water depths of less than 1000 m.
b) For medium to deep water with working pressures less than 15 kpsi (1035 bar)—A sticky lubricating medium based on a water resistant adhesive grease that has the consistency of a soft wax.
c) For ultra deep water typically 3000 m and working pressures above 15 kpsi (1035 bar), an epoxy resin which both lubricates during the lay up process and solidifies to a flexible resin.

Moreover over a given length of fluid conduit there might be provided different levels or types of filling medium depending on the operational requirements. This filling medium ensures that there are no voids in the encapsulation around the inner hose. Any voids within a conduit used in such very high pressure environments would be subject to massive crush loads and could cause conduit failure.

Preferably there may be provided over a length of conduit (or multi conduit umbilical) differing levels of internal pressure containment and/or collapse resistance (with respect to water depth). At the top side virtually no collapse resistance is required but very high containment is essential. Thus topside the collapse-resistance of the hose may be reduced by using a hose with a thinner wall thickness, or a hose with a different construction or changing the grade of material or combinations thereof. To contain the internal pressure in the hose topside a high level of containment is required and thus the reinforcement layer may be increased by using a stronger strand material, a thicker diameter stand material, a better quality strand material and/or by increasing the number of layers of strand material or combinations thereof. On the other hand at the subsea level, low containment strength is acceptable (due to the ambient pressure found at the wellhead) but high collapse resistance is essential. Accordingly for containment purposes the reinforcement strand material strength, diameter or number of layers thereof may be reduced and stronger materials used for the collapse resistant hose and/or by using a different constructions of hose or changing the grade of materials used in the hose or combinations thereof.

Preferably there is provided an outer jacket or sheath extruded over said at least one pair of helically contra-wound high tensile strand material. Desirably said extruded outer jacket has the ability to resist the high temperatures found within the riser annulus and has a thickness in the range of from 0.5 mm to 2 mm, desirably 1 mm to 1.5 mm.

Where the present invention relates to a multi-conduit umbilical comprising a plurality of the aforesaid fluid conduits according to the first aspect of the invention, there is desirably provided a strength member, typically a high tensile steel wire/cable or aramid cable which is bundled together with said plurality of fluid conduits, the bundle being encased or jacketed with a polymer extrusion.

Alternatively and/or additionally there is provided an external tensile strength means in the form of, for example, an aramid or steel braid layer around said bundled conduits together with a further polymer jacket. Preferably said polymer extrusion jacket has a multiplicity of holes along its length, and around its circumference, and the purpose of these holes is to allow the umbilical interstices to freely ventilate and pressure balance with the riser annulus fluid. This is necessary for the operation of an umbilical according to the present invention to ensure that the polymer extrusion jacket is undamaged from the high differential pressures found in the riser annulus and to ensure that the bundled fluid conduits in the umbilical are not crushed. This technique will be known to those skilled in the art.

The number of conduits bundled together will depend entirely on the desired application but the dimensions of the riser annulus will dictate the ultimate number of conduits that can be bundled together. Typically up to twenty (20) but up to thirty (30) separate fluid conduits may be bundled together to provide a plurality of functions in work over operations.

Testing, for example spark testing on the outer most metallic layer, can be used to confirm the quality of the conduit during manufacture.

Where the present invention relates to a multi-conduit umbilical there may be included in said umbilical conductors such as electrical cables or optical fibres and the structure and composition of such multi-conduit umbilicals will be known to those skilled in the art.

Further preferred features and advantages of the present invention will appear from the following detailed description, given by way of an example of a preferred embodiment, illustrated with reference to accompanying drawings in which:—

DESCRIPTION OF THE PREFERRED EMBODIMENT

Figure 1:
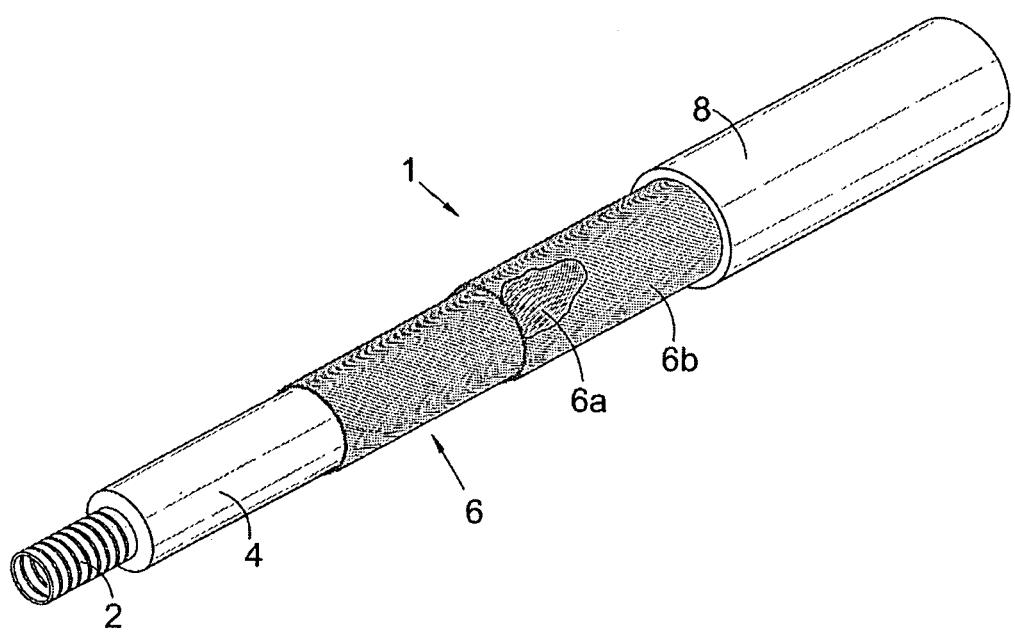
FIG. 1. is a perspective view of a fluid conduit according to the invention.

FIG. 1 shows a fluid conduit, generally indicated by reference number 1, for the transportation of working fluids, such as hydraulic fluids, to a wellhead or the like from a topside location or the like. Typically the fluid conduit would comprise one of a plurality of similar conduits arranged in a multi-conduit umbilical (not shown).

The conduit comprises an inner flexible collapse resistant hose 2 surrounded by an extruded hose liner 4 and two layers 6 of a pair of helically contra-wound high tensile steel wires 6a, 6b. Each turn of the steel wires 6a, 6b is tightly wound against, and is bonded in substantially close contact, with adjacent turns.

In more detail the inner flexible collapse resistant hose 2 comprises a metallic interlock wound carcass having an inside diameter in the range of from 3/16 in (4.76 mm) to 3/4 in (19.05 mm).

The hose liner 4 is an extruded layer of fluoro-polymer approximately 1 mm thickness.

As shown in FIG. 1 there is provided two pairs 6a, 6b of helically contra-wound high tensile steel wire which are wound at an angle of approximately 54° to the longitudinal axis of the fluid conduit.

The conduit is encased in an extruded outer jacket 8 which comprises a layer of high temperature resistant fluoro-polymer approximately 1 mm to 1.5 mm thick.

Various modifications may be made to the above described embodiment without departing from the scope of the present invention. Thus for example instead of using a metallic interlock wound carcass for the inner flexible collapse resistant hose there may be used a thin wall metal tube or a thin wall corrugated metal tube or a helically closed coil spring. Furthermore in the embodiment shown there are two pairs i.e. two layers, of helically contra-wound high tensile steel, though there may be used four or even six layers, that is two or three pairs, of helically contra-wound high tensile steel depending on operational requirements. There may be provided a filler medium around the steel wires and between layers of wire to act as a lubricant and sealer and to avoid voids in the conduit structure.

In use in a multi-conduit umbilical (not shown) up to thirty conduits according to those shown in FIG. 1 would be bundled together and provided with a high tensile steel rope strength member to support the combined weight of the umbilical, with the umbilical being surrounded by the jacket having a multiplicity of apertures along its length and around its circumference so as to fully pressure balance an umbilical in use in a deep-sea water environment. An outer support structure in the form of braided layer may be included to provide additional tensile support.

What is claimed is:

1. A continuous fluid conduit for use in the transportation of working fluids to a wellhead or the like from a topside location or the like, and which is suitable for use in a multi-conduit umbilical, which conduit comprises an inner flexible collapse resistant hose, said collapse resistant hose being surrounded by a hose liner, and at least one pair of helically contra-wound high tensile strand material, with each turn of said strand material being in substantially close contact with adjacent turns thereof:

wherein there is provided a filler material covering adjacent turns and/or layers of said strand material so as to substantially eliminate any voids between adjacent strands of material, with different levels or types of said filler material being provided over the working length of said fluid conduit depending on operational requirements;

and wherein different levels of internal pressure containment and collapse resistance, with respect to water depth, are also provided over said working length of fluid conduit.

2. A fluid conduit as claimed in claim 1 wherein said collapse resistant hose is selected from the group including a metallic interlock wound carcass; a thin wall metal tube; a helically closed coil spring; or a thin wall corrugated metal tube.

3. A fluid conduit as claimed in claim 1 wherein said collapse resistant hose has the capacity to avoid collapsing at pressures of up to 600 bar.

4. A fluid conduit as claimed in claim 1 wherein said hose liner is extruded over said collapse resistant hose so as to provide a protective layer to the collapse resistant hose material.

5. A fluid conduit as claimed in claim 1 wherein said hose liner is a polymer material, selected from the group of fluoro-polymers including PVDF; E-CTFE; PFA or MFA.

6. A fluid conduit as claimed in claim 1 wherein said hose liner is made of a multi-layer construction.

7. A fluid conduit as claimed in claim 1 wherein said high tensile strand material is a high tensile steel wire having a diameter of from 0.25 mm to 1 mm.

8. A fluid conduit as claimed in claim 7 wherein said high tensile steel wire is a high tensile, high carbon steel wire, cold drawn, annealed, heat treated to produce ultimate tensile strengths range between 1200 to 2100 mPa.

9. A fluid conduit as claimed in claim 7 wherein said steel wire is provided with a hot dipped or electroplated galvanic/corrosion protective layer.

10. A fluid conduit as claimed in claim 1 wherein said strand material is wound around the hose liner at an angle of from 45° to 70° relative to the longitudinal axis of the conduit.

11. A fluid conduit as claimed in claim 1 wherein there is used bonding means to bond said adjacent turns of the strand material to each other and to bond each layer of said pair of helically contra-wound high tensile strand material to each other.

12. A fluid conduit as defined in claim 11 wherein the bonding means constitutes the filler material provided around said strand material and between each layer of said strand material.

13. A fluid conduit as claimed in claim 1 wherein there is provided an outer jacket sheath extruded over said at least one pair of helically contra-wound high tensile strand material having a thickness in the range of from 0.5 mm to 2 mm.

14. A multi-conduit umbilical comprising a plurality of fluid conduits as claimed in claim 1 bundled together and provided with an outer sheath/jacket.

15. A multi-conduit umbilical as claimed in claim 14 provided with a high tensile wire/cable bundled together with said plurality of fluid conduits, the bundle being encased or jacketed with a polymer extrusion sheath/jacket.

16. A multi-conduit umbilical as claimed in claim 14 wherein there is provided an external tensile strength means in the form of a braided layer around said bundled conduits together with a further polymer jacket.

17. A multi-conduit umbilical as claimed in claim 14 wherein said sheath/jacket has a multiplicity of holes along its length, and around its circumference.

* * * * *